UNITED STATES PATENT OFFICE 2,651,631

ETHYLENE IMINE-ACRYLYL TRIAZINE REACTION PRODUCTS

Ernst Zerner and Mark W. Pollock, New York, N. Y., assignors to Sun Chemical Corporation, Long Island City, N. Y., a corporation of Delaware No Drawing. Application October 16, 1951, Serial No. 251,650

4 Claims. (Cl. 260—248)

The present invention relates to new organic materials, and is a continuation-in-part of our copending application Serial No. 32,263, filed June 10, 1948, now U. S. Patent 2,615,887.

In our U. S. Patent No. 2,559,835 which was copending with said application Serial No. 32,263, there are described and claimed hexahydro-1,3,5-triacyl-s-triazine materials represented by the general formula

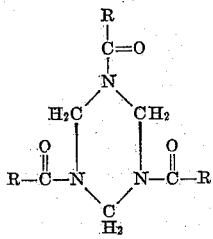

where R represents substituted or unsubstituted open chain hydrocarbon radicals. One of the materials described in the above identified patent is hexahydro-1,3,5-triacrylyl-s-triazine. Also there is described in this patent hexahydro-1,3,5-trimethacrylyl-s-triazine.

We have found according to the present invention that certain new and useful products may be obtained by proper further reactions with the latter materials.

The above derivatives of triazines contain in their molecular structure three vinyl groupings. In accordance with the present invention derivatives are secured by reactions which lead, by the formation of addition compounds to saturation of one, two or three of the vinyl groups present. Such products may be described by the formula

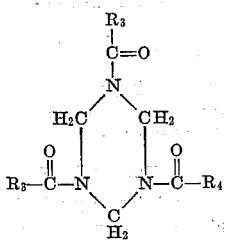

where $R_3$ is a radical which is selected from the group consisting of —CA=CHA where A is selected from the group consisting of hydrogen, halogen and lower alkyl radicals and addition products of —CA=CHA, and where $R_4$ is an addition product of —CA=CHA.

As described in the above identified Patent No. 2,559,835, hexahydro-1,3,5-triacrylyl-s-triazine satisfactorily may be prepared as follows: In a suitable reaction vessel provided with a stirrer, reflux condenser, thermometer and a dropping funnel are placed 265 parts by weight of acrylonitrile dissolved in 400 parts by weight of benzene, together with 2.8 parts of concentrated sulfuric acid. In the dropping funnel is placed a solution of 150 parts by weight of trioxane dissolved in 400 parts by weight of benzene. The acrylonitrile solution is warmed, satisfactorily on a boiling water bath, and the material in the dropping funnel added at a rate such that the mixture is maintained under reflux condition. When all of the solution in the dropping funnel has been added, the resulting admixture is heated under reflux conditions for an additional period of approximately three hours. Subsequently the mixture, which contains a yellow precipitate, is allowed to stand overnight and the precipitate then separated by filtration and subsequently recrystallized from ethanol.

As described in the above identified Patent No. 2,559,835, similar products may be obtained using as starting materials nitriles such as methacrylonitrile, alpha chloracrylonitrile and similar nitriles containing a vinyl group. In place of the individual nitriles, mixtures of nitrile materials can be employed.

Triazines of the above type and containing three vinyl groups may be represented by the formula

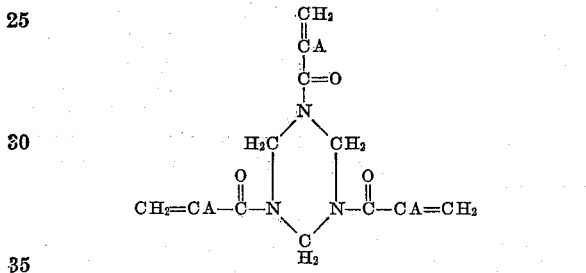

where A is hydrogen, halogen or a lower alkyl radical.

The present invention consists in the preparation of addition products of triazines of the type described above in which one, two or three of the vinyl groups present are converted into saturated groupings by suitable reaction. A variety of different materials can be employed to react with the vinyl groups present in the triazines to add thereto and to form saturated vinyl groupings. Illustrative of some of the materials which will react are compounds such as sodium bisulfite, alcohols, halogens, conjugated diolefins, amines, compounds having an active hydrogen, hydrogen sulfide and mercaptans.

Where the above illustrative materials are employed to effect reaction with triazines containing vinyl groups, either one, two, or three of the vinyl groups may be saturated, depending upon the amount of reacting materials utilized. Where only one or two of the vinyl groups is thus saturated, the resulting material may be polymerized, either alone or in conjunction with other polymerizable monomers to form a resinous product, whose characteristics will be dependent in part upon the modifying reacting material employed to effect saturation of the vinyl groupings prior to polymerization, as described and claimed in U. S. Patent No. 2,559,694 which was copending with application Serial No. 32,263, of which the present application is a continuation-in-part.

Illustrative examples setting forth the present invention include the following:

Example I 20 parts by weight of hexahydro-1,3,5-triacrylyl-s-triazine is dissolved in 500 parts of water at approximately 75° C. When solution is completed there is added thereto 8.2 parts by weight of sodium bisulfite which corresponds to one molecular equivalent of sodium bisulfite per mol of triazine. Addition of the bisulfite is effected while maintaining the solution under agitation conditions. When addition of the bisulfite is completed, the admixture is cooled and may be filtered to remove traces of impurities. A slightly milky solution results. Upon drying of this solution under vacuum conditions, there is obtained a clear white solid which is easily soluble in water and which does not melt or decompose at temperatures up to 250° C.

Example II 20 parts by weight of hexahydro-1,3,5-triacrylyl-s-triazine is dissolved in 500 parts by weight of water at 75° C. When solution is completed there is added, with agitation, 16.4 parts by weight of sodium bisulfite corresponding to two molecular equivalents of sodium bisulfite per mol of triazine. After addition of the bisulfite is completed, the admixture is cooled and filtered to remove impurities. Upon drying of the filtrate under vacuum condition, a clear white water-soluble product is secured which does not melt at temperatures up to 250° C.

Example III

Hexahydro-1,3,5-triacrylyl-s-triazine is treated as described in Example II except that there is used 24.6 parts by weight of sodium bisulfite corresponding to three molecular equivalents of sodium bisulfite per mol of triazine. A water soluble product is secured which does not undergo polymerization.

Example IV 10 parts by weight of hexahydro-1,3,5-triacrylyl-s-triazine is dissolved in 200 parts of chloroform in a reaction vessel equipped with stirring device, thermometer, dropping funnel and reflux condenser. There is then added dropwise a solution of 0.4 part by weight of metallic sodium dissolved in 12 parts of n-butanol. Upon completion of this addition the admixture is stirred for a length of time sufficient to complete the reaction, which with the quantities above described is approximately 8 hours. At the end of this reaction period the mixture is made acidic by addition of glacial acetic acid thereto. The reaction admixture is then diluted with 1½ times its volume of ether and filtered. The filtrate is evaporated to remove ether and chloroform and the residue washed with water and then dissolved in ether. The ether solution is dried, satisfactorily with sodium sulfate, and then filtered. To remove ether the admixture is distilled under reduced pressure. A brown viscous oil, the butyl alcohol addition product of hexahydro-1,3,5-triacrylyl-s-triazine is obtained.

Example V

In a suitable reaction vessel were placed 50 parts of chloroform and 12.5 parts by weight of hexahydro-1,3,5-triacrylyl-s-triazine. The mixture is warmed until solution is completed, then cooled to room temperature and there is then added thereto, in small portions, 8 parts by weight of decyl amine at a rate such that the temperature of the admixture does not rise above approximately 37° C. After addition of the amine is completed, the reaction admixture is stirred for a period of time sufficient to insure completion of the reaction which with the quantities above described is approximately 1.25 hours. The mixture then may be allowed to stand for several hours and subsequently is filtered and the chloroform removed therefrom by distillation under reduced pressure. A clear viscous liquid material is obtained.

Example VI

Following the procedure described in Example V and utilizing 16 parts by weight of decyl amine there is secured an addition product in which two of the three vinyl groups of the triazines have been saturated.

Example VII

In a reaction vessel are placed 50 parts of chloroform and 12.5 parts by weight of hexahydro-1,3,5-triacrylyl-s-triazine and there is then added thereto with stirring 3.65 parts by weight of diethyl amine dissolved in 10 parts of chloroform. After the addition has been completed, the admixture is stirred for approximately 2 hours, stirring then discontinued and the mixture allowed to stand for several hours. It then is filtered and the filtrate evaporated under reduced pressure to remove the chloroform. A white solid product is obtained which may be crystallized from ethanol to give a product which softens at 135° C. and melts at 145° C. Recrystallization of this product from toluene gives a material which softens at 146° C. and melts at 149° C.

The product of this reaction has only one of the vinyl groups of the triazine saturated.

Example VIII

The procedure described in Example VII is followed except that there is used 8 parts by weight of diethyl amine to give a product which is an addition product containing two molecular equivalents of diethyl amine per mol of triazine. The product is water-soluble and is a surface active material.

Example IX

The procedure described in Example VII is followed except that there is utilized 12 parts by weight of diethyl amine to give a reaction product containing three molecular equivalents of diethyl amine per mol of triazine.

Example X 125 parts by weight (one-half mol) of hexahydro-1,3,5-triacrylyl-s-triazine are dissolved in approximately 1500 parts by weight of chloroform containing 5 parts by weight of triethylamine as a polymerization inhibitor. There are then added thereto in small portions and at room temperatures 65 parts by weight (slightly in excess of 1.5 mols) of ethyleneimine, the addition of the same being effected over a period of approximately two hours and under constant agitation conditions. During this period, the temperature of the reaction mixture rose to a maximum of approximately 39° C. When the addition of the ethyleneimine is completed, the mixture is stirred for approximately an additional thirty minutes and is then allowed to stand overnight. The slightly turbid solution which results is filtered and the filtrate thus secured is distilled in a vacuum at a temperature not in excess of 40° C. to eliminate residual solvent remaining in the reaction product. There is thus obtained 193 parts by weight of a viscous residue which is soluble in chloroform and in water. The product thus obtained is one in which all three of the vinyl groups of the triazine have been saturated and corresponds to the formula

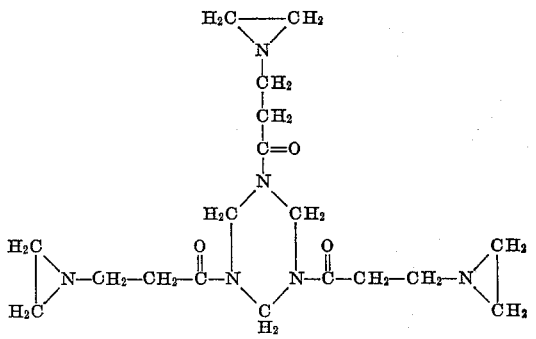

Due to the character of the compound employed for reaction with the vinyl groups of the triazine, the reaction product is one which is polymerizable and thus has many potential uses. The reaction product obtained as above described has a tendency to polymerize upon standing at room temperatures, and aqueous solutions thereof form gels in a short period of time if polymerization is not inhibited. Polymerization of such solutions at normal room temperatures can be prevented by the addition thereto of small amount of triethylamine.

The product of Example X has valuable wool shrinkproofing properties. To impart shrink-resistance to wool fabrics, an aqueous solution of the product of Example X is prepared containing a small amount (approximately 0.5–1.0% by weight based on the weight of the solution) of triethylamine. The wool fabric is then impregnated with the said solution by normal padding operations and is subsequently dried at a temperature of approximately 100°–150° C. for approximately five minutes.

The following table illustrates the percent shrinkage after three washes of three test samples of a wool fabric, one of which was left untreated and is termed the control fabric, the other two samples having been previously subjected to treatment as outlined above with 5% and 10% aqueous solutions respectively of the product of Example X.

| Test Fabrics | Percent Shrinkage | |
|---|---|---|
| | Warp | Fill |
| Control fabric | 16.5 | 13.5 |
| Treated fabric (5% solution) | 9.5 | 8.0 |
| Treated fabric (10% solution) | 7.5 | 6.0 |

*Example XI*

The process described in Example X is followed except that there are employed 145 parts by weight (one-half mol) of hexahydro-1,3,5-trimethacrylyl-s-triazine in place of the triacrylyl triazine. The product thus secured is one in which all three of the vinyl groups have been saturated by the addition of the ethyleneimine. The product may likewise be utilized in the shrinkproofing of wool.

While the above described products constitute preferred embodiments of the invention, changes may be made therein without departing from the scope of the invention, as defined in the appended claims.

What is claimed is:
1. As a new product, a compound of the formula

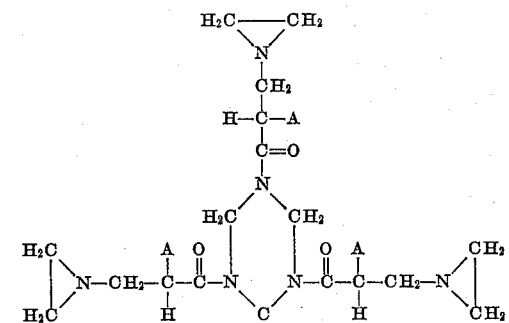

where A is selected from the group consisting of hydrogen, halogen and lower alkyl radicals.

2. As a new product, a compound of the formula

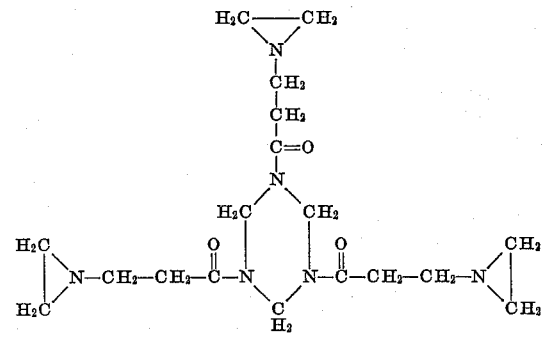

3. As a new product, a compound of the formula

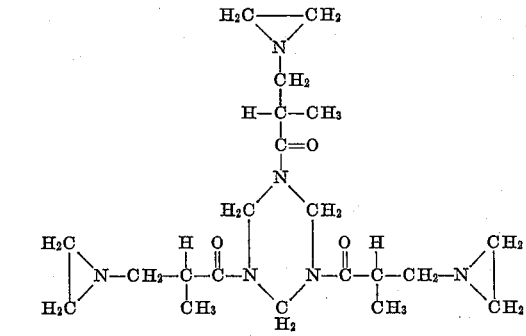

4. As a new product, a compound of the formula

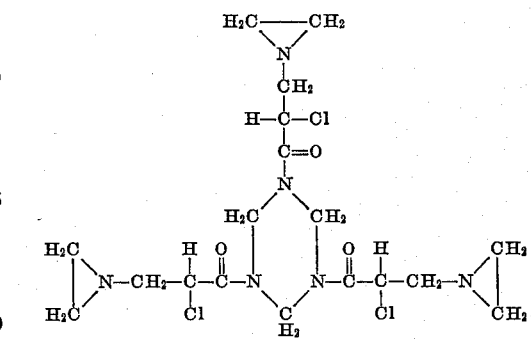

ERNST ZERNER.
MARK W. POLLOCK.

No references cited.